US006374401B1

(12) United States Patent
Curtis (10) Patent No.: US 6,374,401 B1
(45) Date of Patent: Apr. 16, 2002

(54) SYSTEM, METHOD, AND PROGRAM FOR UPDATING REGISTRY OBJECTS WITH A CROSS-PLATFORM INSTALLATION PROGRAM

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,351

(22) Filed: Mar. 29, 1999

(51) Int. Cl.[7] .............................................. G06F 9/455

(52) U.S. Cl. .............................. 717/11; 717/3; 707/203

(58) Field of Search ............................... 717/1, 11, 13; 707/203, 8; 703/23

(56) References Cited

U.S. PATENT DOCUMENTS

| | | | |
|---|---|---|---|
| 5,577,244 A | * 11/1996 | Killebrew et al. | 717/3 |
| 5,742,829 A | * 4/1998 | Davis et al. | 717/11 |
| 5,764,972 A | * 6/1998 | Crouse et al. | 707/1 |
| 5,768,597 A | * 6/1998 | Simm | 717/11 |
| 5,787,491 A | * 7/1998 | Merkin et al. | 711/173 |
| 5,815,415 A | * 9/1998 | Bentley et al. | 703/4 |
| 5,835,911 A | * 11/1998 | Nakagawa et al. | 707/203 |
| 5,859,969 A | * 1/1999 | Oki et al. | 709/200 |
| 5,892,939 A | * 4/1999 | Call et al. | 703/203 |
| 5,930,513 A | * 7/1999 | Taylor | 717/11 |

(List continued on next page.)

OTHER PUBLICATIONS

Hac, "File placement and process assignment due to resources sharing in a distributed system", Proc. of winter simulation conf. ACM, pp. 481–492, 1985.*

Hall et al, "A cooperative approcah to support software deployment using the software dock", ACM ICSE, pp. 174–183, 1999.*

Han et al., "Secure multicat software delivery", IEEE, pp. 207–212, 2000.*

(List continued on next page.)

Primary Examiner—Anil Khatri
(74) Attorney, Agent, or Firm—David W. Victor; Konrad Raynes Victor & Mann (57) ABSTRACT

Disclosed is a method, system, and program for updating a registry object during the installation of a computer program on a computer system. The operating system includes an installation program that updates the registry object during installation of the computer program on the computer system. The registry object and installation program are operating system specific. During execution of the program, a call is made to a cross-platform installation program. The cross-platform installation program is capable of installing the computer program on different operating system platforms. The cross-platform installation program installs the installed components for the computer program on the computer system. The cross-platform installation program further makes a call to an operating system interface program specific to the operating system on which the computer program is being installed. Execution of this operating system interface program updates at least one field in the registry object with information on the installed components of the computer program being installed. Preferred embodiments further include a cross-platform uninstallation program, different from the operating system specific uninstallation program, that is capable of removing the computer program from different operating system platforms. The cross-platform uninstallation program calls an operating system interface program specific to the operating system on the computer system from which the computer program is being uninstalled. The operating system interface program removes information on the installed components removed from the computer system from the registry object.

33 Claims, 4 Drawing Sheets

U.S. PATENT DOCUMENTS

| | | | | | |
|---|---|---|---|---|---|
| 5,953,532 | A | * | 9/1999 | Lochbaum | 717/11 |
| 5,978,590 | A | * | 11/1999 | Imai et al. | 717/11 |
| 6,075,862 | A | * | 6/2000 | Yoshida et al. | 380/28 |
| 6,088,717 | A | * | 7/2000 | Reed et al. | 709/201 |
| 6,094,531 | A | * | 7/2000 | Allison et al. | 717/11 |
| 6,117,187 | A | * | 9/2000 | Staelin | 717/11 |
| 6,125,363 | A | * | 9/2000 | Buzzeo et al. | 707/100 |
| 6,145,126 | A | * | 11/2000 | Matsukura et al. | 717/11 |
| 6,269,480 | B1 | * | 7/2001 | Curtis | 717/11 |

OTHER PUBLICATIONS

Sommerville et al, "Configuration language support for software installation", IEEE, pp. 209, 1994.*

Rauch et al., "Partition repositories for partition cloning OS independent software maintensnce in large cluster of PCs" IEEE, pp. 233–242, 2000.*

AT9–98–853, Global Registry Object for Mapping Registry Functions and Registry Equivalent Function Across Multiple Operating Systems in a Cross–Platform Program, S/N 09/280,371, filing date Mar. 29, 1999.

AT9–98–863, A System, Method, and Program for Providing an Object–Oriented Install Architecture, S/N 09/280, 352, filing date Mar. 29, 1999.

AT9–98–861, A Cross–Platform Program, System, and Method Having a System Independent Registry for Use on Operating Systems Irrespective of a Registry Equivalent, S/N 09/280,368, filing date Mar. 29, 1999.

AT9–98–852, A Cross–Platform Program, System, and Method Having a Global Registry Object for Mapping Registry Equivalent Functions in an OS/2 Operating System Environment, S/N 09/280,350, filing date Mar. 29, 1999.

AT9–98–869, A Cross–Paltform Program, System, and Method Having a Global Registry Object for Mapping Registry Equivalent Functions in an AIX Operating System Environment, S/N 09/280,345, filing date Mar. 29, 1999.

AT9–98–851, A Cross–Platform Program, System, and Method Having a Global Registry Object for Mapping Registry Functions in a Windows Operating System Environment, S/N 09/280,349, filing date Mar. 29, 1999.

Indigo Rose Software Design Corp. "Setup Factory 4.0" User's Guide, 1998.

* cited by examiner

SYSTEM, METHOD, AND PROGRAM FOR UPDATING REGISTRY OBJECTS WITH A CROSS-PLATFORM INSTALLATION PROGRAM

CROSS-REFERENCE TO RELATED APPLICATIONS

This application is related to the following co-pending and commonly-assigned patent applications, which applications were filed on the same date herewith, and which applications are incorporated herein by reference in their entirety:

"A Cross-Platform Program, System, and Method Having a Global Registry Object for Mapping Registry Equivalent Functions in an AIX Operating System Environment," having U.S. patent application Ser. No. 09/280,345;

"A Cross-Platform Program, System, and Method Having a Global Registry Object for Mapping Registry Equivalent Functions in an OS/2 Operating System Environment," having U.S. patent application Ser. No. 09/280,350;

"Cross-Platform Program, System, and Method Having a Global Registry Object for Mapping Registry Functions in a Windows Operating System Environment," having U.S. patent application Ser. No. 09/280,349;

"Global Registry Object for Mapping Registry Functions and Registry Equivalent Functions Across Multiple Operating Systems in a Cross-platform Program," having U.S. patent application Ser. No. 09/280,371;

"A Cross-platform Program, System, and Method Having a System Independent Registry for Use on Operating Systems Irrespective of a Registry Equivalent," having U.S. patent application Ser. No. 09/280,368;

"A System, Method, and Program for Enabling a Use of Property Object Having a Variable for a Property Value in a Cross-Platform Program," having U.S. patent application Ser. No. 09/280,344;

"A System, Method, and Program for Overriding Program Properties," having U.S. patent application Ser. No. 09/280,346;

"A System, Method and Program for Providing an Object-Oriented Install Architecture," having U.S. patent application Ser. No. 09/280,352;

"A System, Method, and Program for Automatic Error Detection While Utilizing a Software State Machine for Carrying out the Process Flow of a Software Program," having U.S. patent application Ser. No. 09/280,375

"A System, Method, and Program for Utilizing a Software State Machine for Carrying Out the Process Flow of a Software Program," having U.S. patent application Ser. No. 09/280,376;

"A System, Method, and Program for Enabling a Software Program to Automatically Select a System-dependent Function," having U.S. patent application Ser. No. 09/280,369;

"A System, Method, and Program for Mapping a Global Object to Desktop Elements of Different Operating Systems," having U.S. patent application Ser. No. 09/280,374;

"A System, Method, And Program For Processing Dependencies Using a Dependency Object," having U.S. patent application Ser. No. 09/280,370;

"System, Method, and Program for Modifying a Text File," having U.S. patent application Ser. No. 09/280,348;

"A System, Method, and Program For Preserving Background Settings During Install and Uninstall Operations," having U.S. patent application Ser. No. 09/280,374;

"A System, Method, And Program for Modifying a Library Object," having U.S. patent application Ser. No. 09/280,347;

"A System, Method, And Program For Installation on Drives Using a Drive Object," having U.S. patent application Ser. No. 09/280,353;

"A System, Method, and Program for Performing Program Specific Uninstall Operations," having U.S. patent application Ser. No. 09/280,373.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method, system, and program for updating registry objects with a cross-platform installation program and, in particular using native operating system commands to update the registry object.

2. Description of the Related Art

An installer program is a software program that enables a programmer to write specific code to install a given application program onto the drives of a computer in a way that enables the given application program to work correctly with the computer's environment, including its operating system. There are several types of installers—Java installers and operating system specific installers, e.g., Microsoft Windows installers, and International Business Machines ("IBM") OS/2 and AIX operating system installers, etc. Many of the install programs existing today have various limitations in their functionality as discussed below.

One type of Java installer is provided by a software company known as InstallShield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support. A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as the IBM OS/2 and AIX operating systems.

Another Java installer is called "Install Anywhere" from ZeroG. This Java installer program also has a default panel that is not configurable, e.g., the order in which panels appear is not customizable. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Microsoft Windows' 32 installer, e.g., Microsoft Windows 95/98 and NT. Although this installer program is widely used throughout the industry, it is based upon a proprietary scripting language developed by InstallShield. The scripting language is similar to Basic programming language. Programmers, who generally have experience and knowledge of object oriented programs such as C++ and Java, must learn this proprietary InstallShield script, which is not related to the popular computer languages, in order to program an Install program. This unfamiliarity with the proprietary InstallShield scripting language complicates the installer programming process.

One impediment to developing a cross-platform installation program is that each operating system has its own native installation program that utilizes specific file formats including the file sets to install and specific native commands for updating operating system specific data structures. Such operating system specific data structures include product registry database files that maintain information on installed components and computer products. The operating system utilizes this system information when performing certain functions with respect to the installed components. For instance, the IBM AIX operating system includes an object data manager (ODM) that stores system information and manages data for application programs. The ODMs include device configuration information, vital product data for installation and update procedures, communications configuration information, and system resource information.

The AIX installation program, which is called with the "installp" command, installs a base level program or computer product, referred to as a fileset, and updates previous versions. As part of the installation process, the installp command will update the AIX ODM product registry to include information on the installed components. The installp and ODM aspects of AIX are described in IBM publication "AIX Version 4.3 General Programming Concepts: Writing and Debugging Programs," IBM publication no. SC23-4128 (IBM Copyright 1997), which publication is incorporated herein by reference in its entirety. Other operating systems include similar native product registries, files or databases and native installation commands to install and uninstall products and update information in the native product registry.

Thus, there is a need in the art for a cross-platform installation program that is capable of installing and uninstalling a product on different operating systems and, at the same time, is capable of performing the necessary updating of operating system native product registries and other such registry databases and files.

SUMMARY OF THE PREFERRED EMBODIMENTS

To overcome the limitations in the prior art described above, preferred embodiments disclose a system, method, and program for updating a registry object during the installation of a computer program on a computer system. The operating system includes an installation program that updates the registry object during installation of the computer program on the computer system. The registry object and installation program are operating system specific. During execution of the program, a call is made to a cross-platform installation program. The cross-platform installation program is capable of installing the computer program on different operating system platforms. The cross-platform installation program installs the installed components for the computer program on the computer system. The cross-platform installation program further makes a call to an operating system interface program specific to the operating system on which the computer program is being installed. Execution of this operating system interface program updates at least one field in the registry object with information on the installed components of the computer program being installed.

In further embodiments, the registry object is a product registry database including information on installed files. The operating system product registry database is updated by making a call to a native operating system command to update fields in the product registry database with information on the installed components.

In further embodiments, a registry object is updated during the uninstallation of a computer program. The operating system includes an uninstallation program that removes installed components of an installed computer program from the computer system and updates the registry object during the uninstallation of the computer program from the computer system. The program makes a call to a cross-platform uninstallation program that is capable of removing the computer program from different operating system platforms. The cross-platform uninstallation program removes the installed components of the installed computer program. The cross-platform uninstallation program further calls an operating system interface program specific to the operating system on the computer system from which the computer program is being uninstalled. The operating system interface program removes information on the installed components removed from the computer system from the registry object.

Preferred embodiments provide the use of a cross-platform installation and uninstallation program that utilize the same installation package across operating systems. Thus, the operating system specific installation packages do not need to be created for each operating system on which the product will be installed. Preferred embodiments update operating system specific files, such as product registry objects, by making a call to an operating system interface program including native operating system commands. The operating system interface program uses native operating system commands to makes the same changes to the product registry object that the operating system installation or uninstallation program would make. Thus, the effect of installation by the cross-platform installation program or the native operating system installer is the same. In this way, the product registry object and other operating system specific files would include the necessary information on products and installed components using the cross-platform programs.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
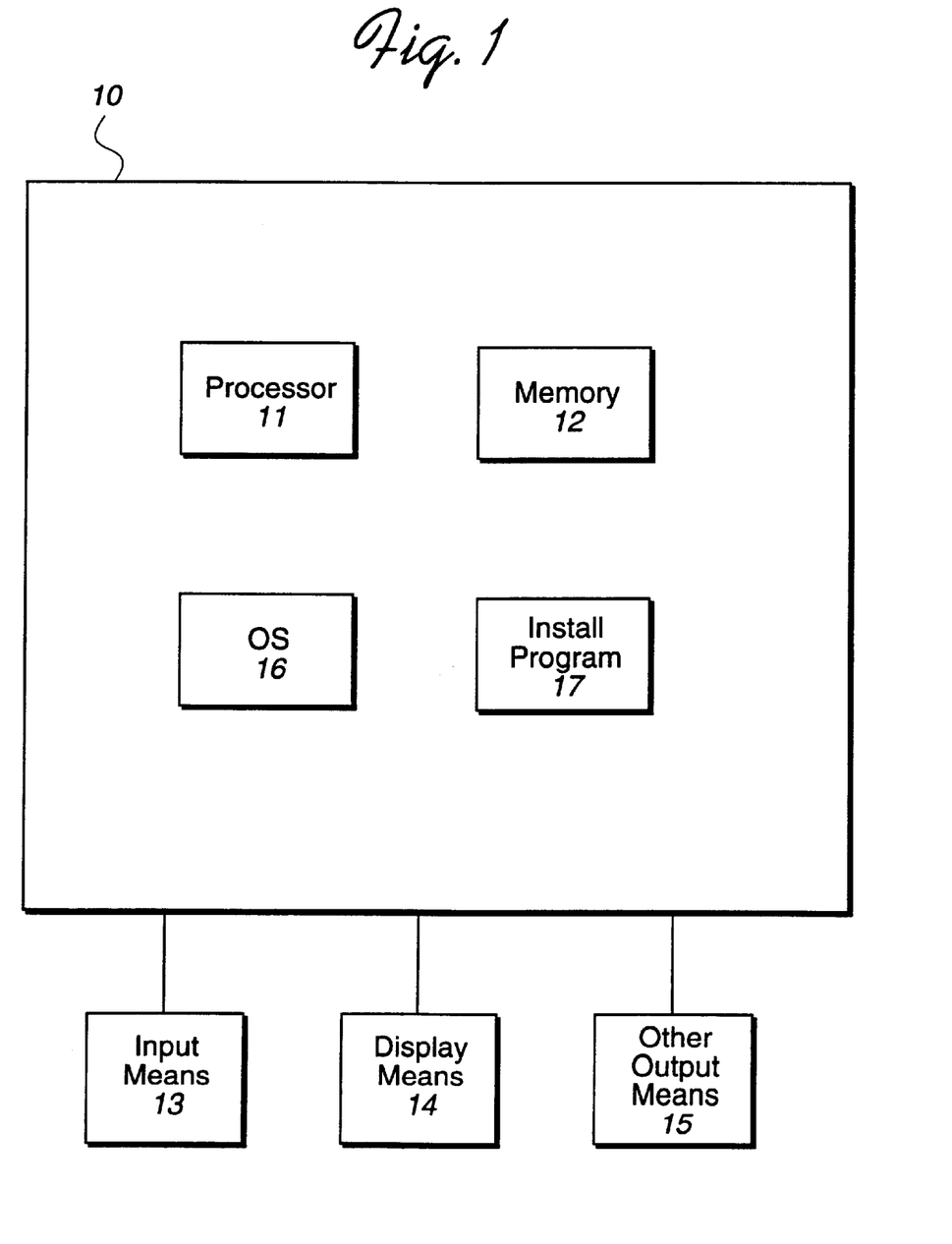
FIG. 1 is a block diagram illustrating a software and hardware environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed.

The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following-the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
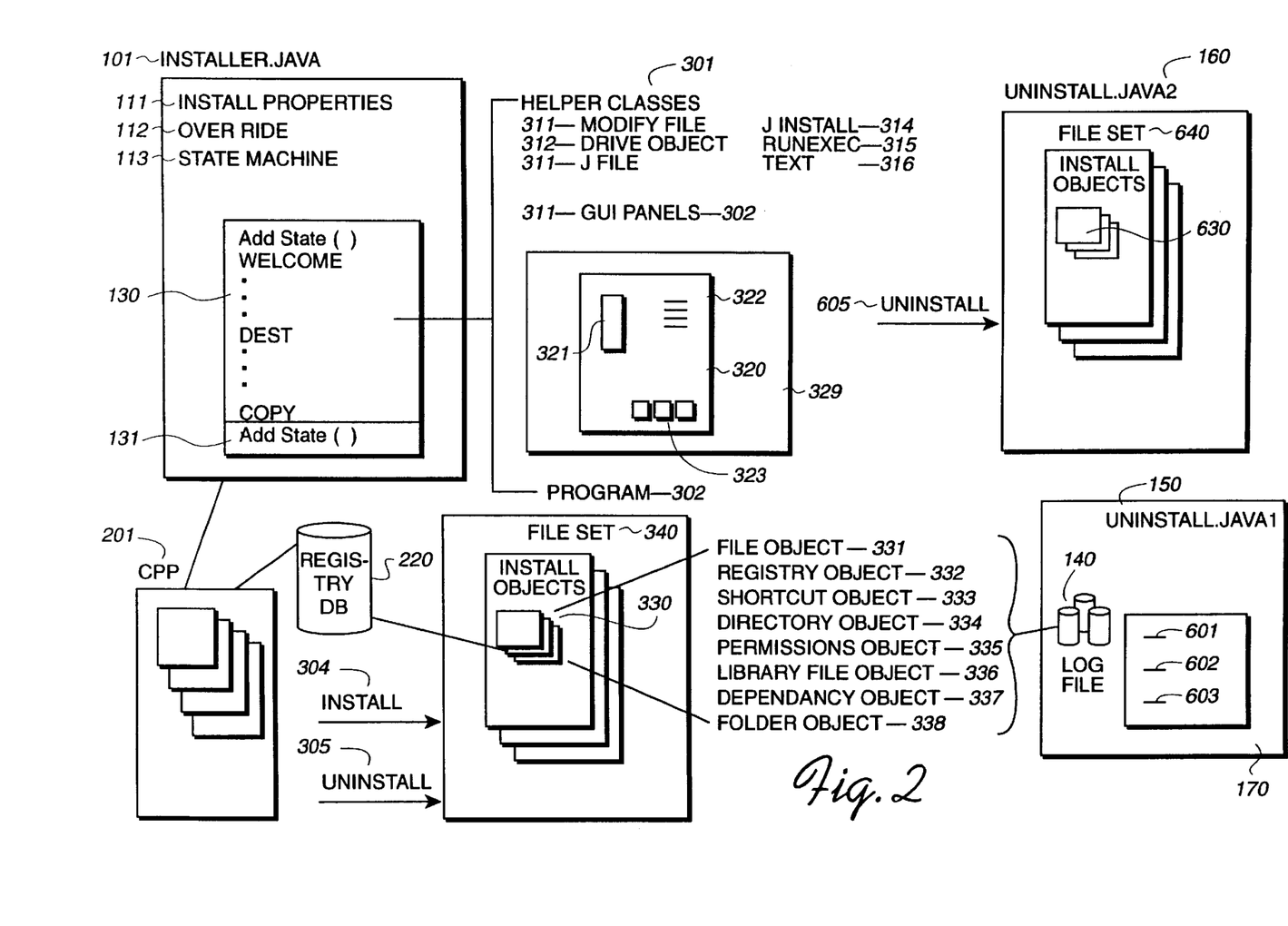
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfilly installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object, fileset objects, install objects, where each fileset object and install object contains means to install and uninstall itself and to log itself; vii) enabling the management of folders, shortcuts and icons; viii) enabling environment variables to be read, created, modified and deleted; ix) providing dependency checking of prerequisite programs during both install and uninstall; and x) providing various logs, e.g. a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

Updating System Product Registry Objects

As discussed the CPP files 201 contain operating/system specific code, called by the install program 17, to perform platform specific processing at different points of the installation process. The CPPs 201 are thus an interface program between the installation and the operating system. As discussed, there is a separate CPP module or file for each operating system on which the install program 17 is capable of installing the program object 303. In this way, the install program 17 is a cross platform installation program that install the file sets 340 onto a particular computer system. Operating system specific operations are accomplished by the cross-platform install program 17 calling the particular CPP module 201 specific to the operating system on which the install program 17 is executing. The operating system specific CPP modules 201 function as an interface program specific to the operating system to perform native operating system operations specific to the operating system on which the install program 17 is performing the installation.

All operating systems maintain a database structure, referred to as a product registry, registry database or registry file, that contains information on installed components. The term "registry object" as used herein refers to any such file, database, registry, data structure, or any other object, or combination thereof, that maintains installation information or information on installed components and products within an operating system. For instance, AIX has the ODM files that contain system information, including information on installed components, dependencies, etc. Different operating systems also include installation commands. These native installation commands write information on the installed components to the product registry object. The operating systems may access such product registry information on a regular basis for purposes unrelated to installation. For instance, the AIX LSLPP command processes the ODM file to list installed products. In preferred embodiments, the CPP module 201 for a specific operating system further includes native operating system commands to update the native product registry object with installation information.

Figure 3:
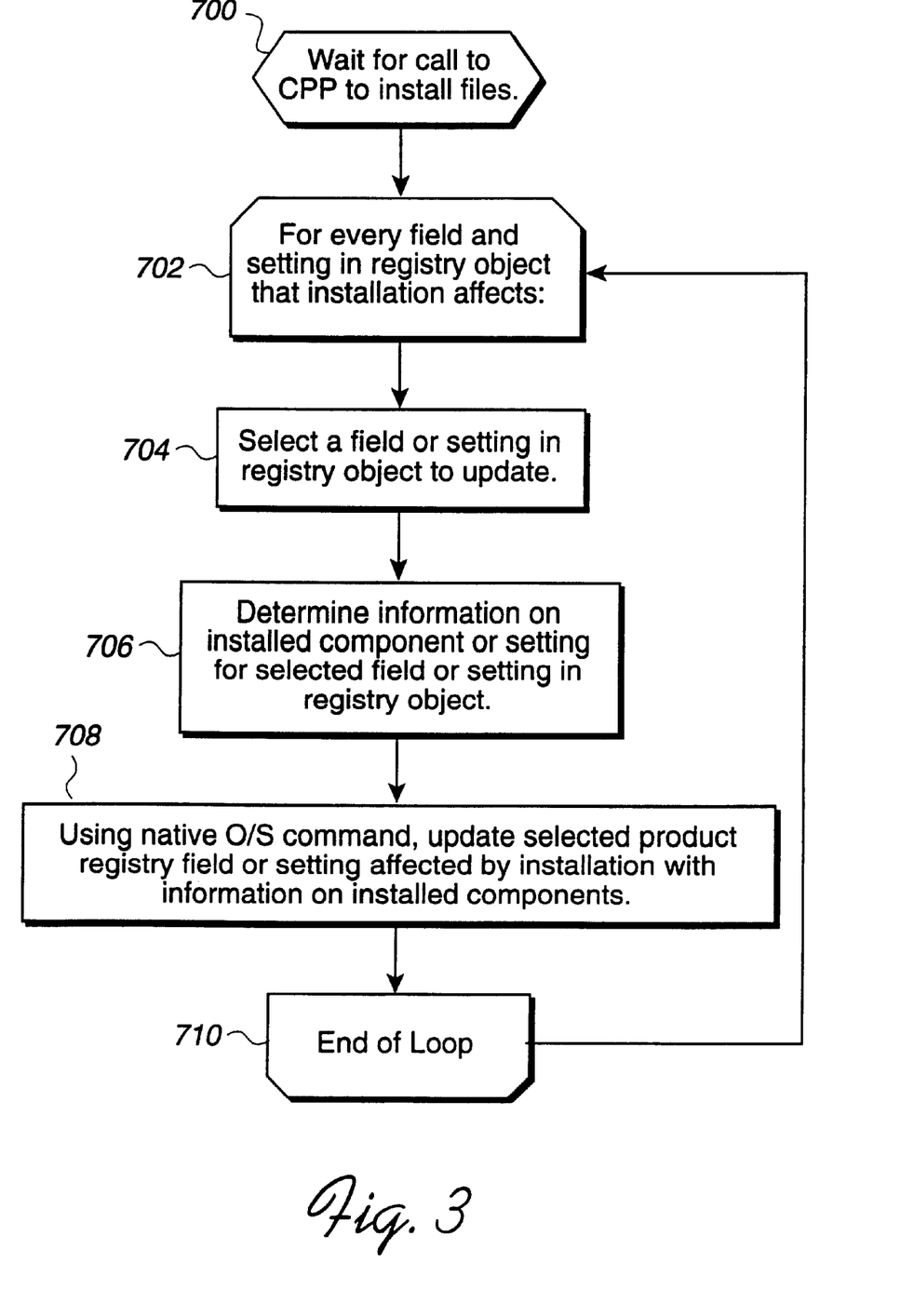
FIG. 3 illustrates logic to update the operating system product registry object during the installation of a computer program in accordance with preferred embodiments of the present invention.

FIG. 3 illustrates logic implemented in the CPP 201 modules to update an operating system specific registry object after installation with information on installed components or setting changes resulting from the installation that affects information maintained in the product registry object. Thus, the actual program written to implement the logic of FIG. 3 would require specific knowledge of all the fields in the operating system product registry object that are affected by an installation. Moreover, the implementation of FIG. 3 would require use of the native operating system commands to update the operating system registry object. At block 700, the install program 17 processes a call to the CPP program to update the product registry object with information on the installed components. This call may pass the installed components. For instance, the installation program developer may insert a call within install objects 330 after a file set or object is installed and copied to the system. An example of a method or call to the CPP 201 is:

install (String type, Object obj, FileSet fs). (1)

The type parameter indicates the type of object being installed, file registry, INIT, etc. The parameter obj is the object being installed and the parameter fs is the FileSet being installed. The install method (1) makes a call to the CPP module 201 for the operating system on which the program is being installed to update the operating system product registry object with information on the FileSet or object being installed.

For every field and setting in the product registry object that is affected by the installation, the logic of FIG. 3, at the loop starting at block 702 through block 710, will update that field and/or setting with information on the installed component. In this way, the operating system specific registry object is updated by the operating system interface program CPP 201 just as it would have been updated had the installation been performed using the native operating system installation command, e.g., installp for AIX. The CPP module 201 (at block 704) then selects a particular field or setting in the operating system registry object to update. The CPP module 201 (at block 706) then determines information on the installed component or setting from the parameter FileSet or Object passed with the call to the CPP module 201. Using the native operating system commands for modifying the operating system registry object, the CPP module 201 (at block 708) updates the selected fields and/or settings with the determined information on the installed component. This process is repeated for each field or setting in the operating system registry object affected by the installation.

For instance, when installing a FileSet, the call to the CPP module 201 for AIX will obtain information on the permissions for the installed file using the AIX "chmod" command. Permissions in AIX may be set to 755 by default, which permits reads and executes by the owner, group or others, and permits writes by the owner. The owner may also be changed using the AIX "chown" command. Further, in AIX, the native AIX installp command calls another command, inusave, that generates a list of files added during the installation, which includes an entry for each saved file in an update list.

The AIX commands use the AIX specific installation package and file sets to determine the information to write to the AIX product registry update list. To accomplish the same results in the AIX registry object that the AIX installation program accomplishes using the AIX specific installation package, the AIX CPP module 201, executing the logic of FIG. 3, would use AIX native ODM commands to update the product registry ODM with the same information that the AIX installp would have placed in the ODM files.

The preferred installation program installs files using the cross-platform code, preferably written in a cross-platform language such as Java, and bypasses the need to use the native installation routines, which requires the development of specific installation packages for each operating system on which product will be installed. Thus, with preferred embodiments, an installation developer need only develop a single installation package, i.e., the install program 303, including FileSets 340 and install objects 330, that may then be applied to different operating system platforms. Further, the preferred embodiment install program 17, which operates in the same manner across different operating system platforms, has the same affect on the operating system as the native installation program. This is accomplished with the logic of FIG. 3 that updates specific operating system product registry databases with the same information the native installation command would place in such files. The CPP 201 would contain separate modules for each operating systems on which the install program 17 operates. Each of these separate CPP 201 modules would separately implement the logic of FIGS. 3 and 4 to update the operating system specific registry object.

For software products that have been installed using the cross-platform install program 17, calling the uninstall program 605 would remove the settings and fields made to the operating system registry object during installation by the CPP module 201. As discussed, during installation, the install objects 330 are written to a log file 140. During uninstallation, the uninstallation program, uninstall.Java2, builds up the FileSets 640 to uninstall, which are the image of the installed FileSets 340.

Figure 4:
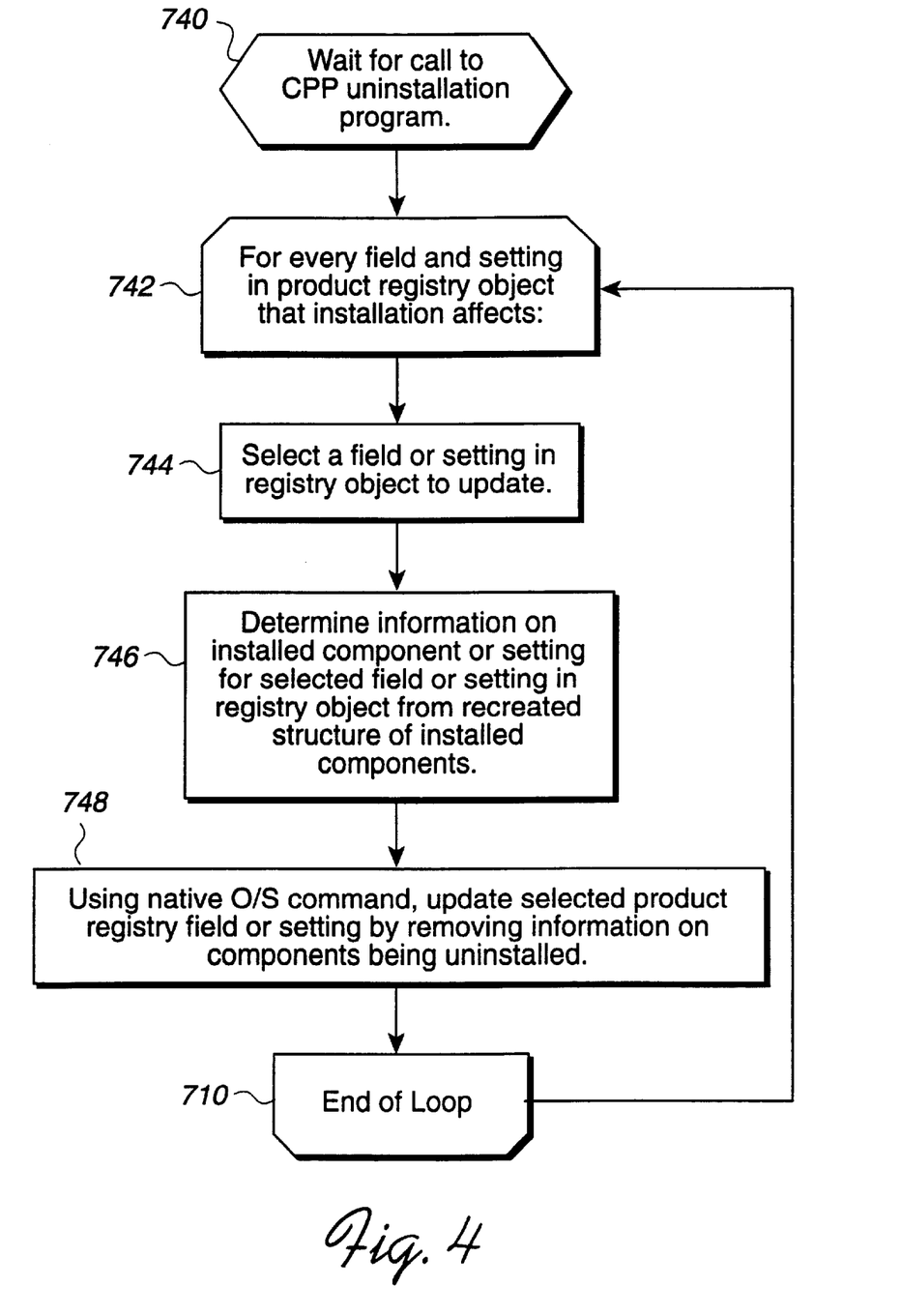
FIG. 4 illustrates logic to update the operating system product registry object during the uninstallation of a computer program in accordance with preferred embodiments of the present invention.

FIG. 4 illustrates logic implemented in the install program 17 to remove information from the operating system specific registry object during uninstallation. The logic of FIG. 4 may be executed if the user calls the uninstall 605 program. In further embodiments, a hook call may be added to the native operating system uninstall program to make a call to a script or batch file whenever a call is made to the uninstall program. This script would run the cross-platform uninstall program 605 instead of the native install program if the product being uninstalled was installed using the cross-platform install program 17 of preferred embodiments. In this way, the operating system command would not inadvertently be used to uninstall a product it did not install.

With respect to FIG. 4, control begins at block 740 with a call to the uninstall program 605. As discussed, this may be made directly using the uninstall command 605 or via a script file executed by a call to the native operating system. During uninstallation, a call is made to the CPP 201 to perform specific native operating system operations to remove information from the operating system registry object. The call may comprise a method, such as:

uninstall (String type, Object obj, FileSet fs), (2)

that is made within the uninstall program, e.g., uninstall-java2 160. The type parameter indicates the type of object being uninstalled, file registry, INIT, etc. The parameter obj is the object being uninstalled and the parameter fs is the FileSet being uninstalled.

For every field and setting in the product registry object that is affected by the uninstallation, the logic of FIG. 4, at the loop starting at block 742, will remove the information concerning the installed component being removed. In this way, the operating system specific registry object is updated by the call to the uninstall method (2) just as it would have been updated had the uninstallation been performed using the native operating system uninstallation command. The CPP module 201, for the operating system on which the uninstall is occurring, executes (at block 744), the uninstall method (2) to select particular fields or settings in the operating system product registry object to update. The CPP module 201 (at block 746) then processes the recreated FileSets 640 and other objects 630 to determine information on the previously installed components or setting from the parameter FileSet or Object passed to the uninstall method (2). Using the native operating system commands for modifying the operating system registry object, the CPP module 201 (at block 748) removes information on the installed component from the selected fields and/or settings. This process is repeated for each field or setting in the operating system product registry object related to the product being uninstalled.

In this way, the cross-platform uninstallation process removes any changes made to the native operating system registry object to produce the same results on such files as if the uninstallation was performed by the native operating system command. In prior art systems, the install developer would develop separate installation packages for each operating system on which the program will be installed to use the platform specific installation command. However, with the preferred embodiment, the installation developer only needs to create a single installation package of file sets that may be applied across operating system platforms. The CPP 201 program is thus an interface between the install program 17 and operating system. The CPP 201 includes specific modules for each platform on which the install program 17 can run. The CPP 201 program updates operating system registry object, the CPP module 201 (at block 748) removes information on the installed component from the selected fields and/or settings. This process is repeated for each field or setting in the operating system product registry object related to the product being uninstalled. system specific product registry objects in the same manner the native install program would perform such updates during installation and uninstallation.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

Preferred embodiments described specific commands used to update the product registry object in the AIX system, referred to as ODM files. However, a specific CPP 201 module may be written for each operating system on which the install program 17 operates to update the specific product registry objects for that operating system platform, e.g., Solaris, Linux, etc.

Preferred embodiments were described with respect to updating information in operating system specific product registry objects using the native operating system commands. However, the logic of FIGS. 3 and 4 may apply to update any type of registry object that includes information and settings on installed components that is updated when programs are installed and uninstalled. As previously mentioned, the term registry object as used herein refers to any file, database, registry, data structure, or any other object, or combination thereof, that maintains installation information or information on installed components and products within the operating system.

In summary, preferred embodiments disclose a method, system, and program for updating a registry object during the installation of a computer program on a computer system. The operating system includes an installation program that updates the registry object during installation of the computer program on the computer system. The registry object and installation program are operating system specific. During execution of the program, a call is made to a cross-platform installation program. The cross-platform installation program is capable of installing the computer program on different operating system platforms. The cross-platform installation program installs the installed components for the computer program on the computer system. The cross-platform installation program further makes a call to an operating system interface program specific to the operating system on which the computer program is being installed. Execution of this operating system interface program updates at least one field in the registry object with information on the installed components of the computer program being installed. Preferred embodiments further include a cross-platform uninstallation program, different from the operating system specific uninstallation program, that is capable of removing the computer program from different operating system platforms. The cross-platform uninstallation program calls an operating system interface program specific to the operating system on the computer system from which the computer program is being uninstalled. The operating system interface program removes information on the installed components removed from the computer system from the registry object.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating a registry object during the installation of a computer program on a computer system having an operating system, comprising:

making a call to a cross-platform installation program, wherein the cross-platform installation program is capable of installing the computer program on different operating system platforms;

installing, with the cross-platform installation program, installed components for the computer program on the computer system;

selecting, with the cross-platform installation program, one of a plurality of operating system interface programs that is specific to the operating system on which the computer program is being installed, wherein each operating system interface program is capable of performing operating system specific operations on a different operating system platform;

making a call, with the cross-platform installation program, to the selected operating system interface program; and updating, with the called operating system interface program, at least one field in the registry object with information on the installed components of the computer program being installed.

2. The method of claim 1, wherein the operating system includes an operating system installation program that processes an operating system specific installation package of components to install, wherein installing the installed components comprises the cross-platform installation program processing a cross-platform installation package of components to install.

3. The method of claim 2, wherein the call to the operating system interface program is included in the cross-platform installation package and is called after the computer program is copied to the system during installation.

4. The method of claim 1, wherein the operating system interface program includes native operating system commands, wherein updating the field in the registry object comprises making a call to the native operating system commands to update the registry object with information on the installed components.

5. The method of claim 1, wherein the registry object includes information on installed files and updating the field in the operating system product registry object comprises making a call to a native operating system command to update fields in the product registry object with information on the installed components.

6. A method for updating a registry object during the uninstallation of a computer program on a computer system having an operating system, comprising:

making a call to a cross-platform uninstallation program that is capable of removing the computer program from different operating system platforms;

removing, with the cross-platform uninstallation program, the installed components of the installed computer program;

selecting, with the cross-platform installation program, one of a plurality of operating system interface programs that is specific to the operating system on which the computer program is being uninstalled, wherein each operating system interface program is capable of performing operating system specific operations on a different operating system platform;

making a call, with the cross-platform uninstallation program, to the selected operating system interface program specific to the operating system on the computer system from which the computer program is being uninstalled; and removing, with the called operating system interface program, information on the installed components removed from the computer system from the registry object.

7. The method of claim 6, wherein removing the installed components comprises:

processing an uninstallation file including information on installed components;

determining the installed components to remove from the computer system from processing the uninstallation file; and determining the information to remove from the registry object from processing the uninstallation file.

8. The method of claim 7, wherein the uninstallation file is created during installation of the computer program onto the computer system by a cross-platform installation package that is different from an operating system specific uninstallation file used during uninstall.

9. The method of claim 7, wherein the operating system interface includes native operating system commands, and wherein removing information of installed components comprises making a call to the native operating system commands in the operating system interface program to edit the registry object to remove the information on the installed components.

10. The method of claim 9, wherein the registry object includes information on installed components.

11. The method of claim 6, wherein the operating system includes an uninstallation program that removes installed components of an installed computer program from the computer system and updates the registry object during uninstallation, further comprising:

executing the operating system uninstallation program before calling the cross-platform uninstallation program; executing a script program in response to executing the operating system uninstallation program to perform:

(i) determining whether the computer program to uninstall was installed using a cross-platform installation program instead of an operating system specific installation program;

(iii) making a call to the cross-platform uninstallation program to uninstall the computer program after determining that the computer program was installed using the cross-platform installation program; and (iii) uninstalling the computer program using the operating system uninstallation program after determining that the computer program was installed using the operating system specific installation program.

12. A system for updating a registry object during the installation of a computer program, comprising:

a computer system;

at least one memory device accessible to the computer system including:

(i) an operating system;

(ii) a cross-platform installation program, wherein the cross-platform installation program is capable of installing the computer program on different operating system platforms; and (iii) a plurality of operating system interface programs, wherein each operating system interface program is capable of performing operating system specific operations on a different operating system platform; and program logic executed by the computer system in communication with the memory device, comprising:

(i) means for making a call to the cross-platform installation program;

(ii) means for installing, when executing the cross-platform installation program, installed components for the computer program on the computer system;

(iii) means for selecting, with the cross-platform installation program, one of the plurality of operating system interface programs that is specific to the operating system on which the computer program is being uninstalled;

(iv) means for making a call to the selected operating system interface program;

(v) means for updating, by executing the called operating system interface program, at least one field in the registry object with information on the installed components of the computer program being installed.

13. The system of claim 12, wherein the operating system includes an operating system installation program that processes an operating system specific installation package of components to install, wherein the memory device further includes a cross-platform installation package of components to install, and wherein the program logic further comprises means for processing, by executing the cross-platform installation program, the installation package to install the components.

14. The system of claim 12, wherein the operating system interface program is included in the cross-platform installation package and is called after the computer program is copied to the system during installation.

15. The system of claim 13, wherein the operating system interface program includes native operating system commands, wherein the means for updating the field in the registry object comprises making a call to the native operating system commands to update the registry object with information on the installed components.

16. The system of claim 12, wherein the registry object includes information on installed files and the means for updating the field in the operating system registry object comprises making a call to a native operating system command to update fields in the registry object with information on the installed components.

17. A system for updating a registry object during the uninstallation of a computer program, comprising:

a computer system having an operating system;

a memory device accessible to the computer system, comprising:

(i) a cross-platform uninstallation program that is capable of removing the computer program from different operating system platforms;

(ii) a plurality of operating system interface programs, wherein each operating system interface program is capable of performing operating system specific operations on a different operating system platform; and program logic executed by the computer system, comprising:

(i) means for removing, by executing the cross-platform uninstallation program, the installed components of the installed computer program;

(ii) selecting, with the cross-platform installation program, one of the plurality of operating system interface programs that is specific to the operating system on which the computer program is being uninstalled;

(iii) means for making a call, by executing the cross-platform uninstallation program, to the selected operating system interface program; and (iv) means for removing, by executing the selected operating system interface program, information on the installed components removed from the computer system from the registry object.

18. The system of claim 17, wherein the memory device further includes an uninstallation file including information on installed components, wherein the means for removing the installed components comprises:

processing the uninstallation file to determine the installed components to remove from the computer system; and determining the information to remove from the registry object from processing the uninstallation file.

19. The system of claim 18, wherein the uninstallation file is created during installation of the computer program onto the computer system by a cross-platform installation package that is different from an operating system specific uninstallation file used during uninstall.

20. The system of claim 17, wherein the operating system interface includes native operating system functions, and wherein the means for removing information of installed components comprises making a call to the native operating system commands, by executing the operating system interface program, to edit the registry object to remove the information on the installed components.

21. The system of claim 20, wherein the registry object is a product registry object including information on installed components.

22. The system of claim 17, wherein the operating system includes an uninstallation program that removes installed components of an installed computer program from the computer system and updates the registry object during uninstallation, wherein the memory device further comprises a script program including a call to the cross-platform uninstallation program, and wherein the program logic further comprises:

executing the operating system uninstallation program before calling the cross-platform uninstallation program;

means for executing a script program in response to executing the operating system uninstallation program, wherein the script program comprises program logic executed by the computer system, including:

(i) means for determining whether the computer program to uninstall was installed using a cross-platform installation program instead of an operating system specific installation program;

(iii) mean for making a call to the cross-platform uninstallation program to uninstall the computer program after determining that the computer program was installed using the cross-platform installation program; and (iii) means for uninstalling the computer program using the operating system uninstallation program after determining that the computer program was installed using the operating system specific installation program.

23. An article of manufacture for use in updating a registry object during the installation of a computer program on a computer system having an operating system, the article of manufacture comprising computer useable media accessible to the computer system, wherein the computer usable media includes at least one computer program that is capable of causing the computer system to perform:

making a call to a cross-platform installation program, wherein the cross-platform installation program is capable of installing the computer program on different operation system platforms;

installing, with the cross-platform installation program, installed components for the computer program on the computer system;

selecting, with the cross-platform installation program, one of a plurality of operating system interface programs that is specific to the operating system on which the computer program is being installed, wherein each operating system interface program is capable of performing operating system specific operations on a different operating system platform;

making a call, with the cross-platform installation program, to the selected operating system interface program specific to the operating system on which the computer program is being installed; and updating, with the called operating system interface program, at least one field in the registry object with information on the installed components of the computer program being installed.

24. The article of manufacture of claim 23, wherein the operating system installation program processes an operating system specific installation package of components to install, wherein installing the installed components comprises the cross-platform installation program processing a cross-platform installation package of components to install.

25. The article of manufacture of claim 24, wherein the call to the operating system interface program is included in the cross-platform installation package and is called after the computer program is copied to the system during installation.

26. The article of manufacture of claim 24, wherein the operating system interface program includes native operating system commands, wherein updating the field in the registry object comprises making a call to the native operating system commands to update the registry object with information on the installed components.

27. The article of manufacture of claim 23, wherein the registry object is a product registry object including information on installed files and updating the field in the operating system product registry object comprises making a call to a native operating system command to update fields in the product registry object with information on the installed components.

28. An article of manufacture for use in updating a registry object during the uninstallation of a computer program on a computer system having an operating system, the article of manufacture comprising computer useable media accessible to the computer system, wherein the computer usable media includes at least one computer program that is capable of causing the computer system to perform:

making a call to a cross-platform uninstallation program that is capable of removing the computer program from different operating system platforms;

removing, with the cross-platform uninstallation program, the installed components of the installed computer program;

selecting, with the cross-platform installation program, one of a plurality of operating system interface programs that is specific to the operating system on which the computer program is being uninstalled, wherein each operating system interface program is capable of performing operating system specific operations on a different operating system platform;

making a call, with the cross-platform uninstallation program, to the selected operating system interface program specific to the operating system on the computer system from which the computer program is being uninstalled; and removing, with the called operating system interface program, information on the installed components removed from the computer system from the registry object.

29. The article of manufacture of claim 28, wherein removing the installed components comprises:

processing an uninstallation file including information on installed components;

determining the installed components to remove from the computer system from processing the uninstallation file; and determining the information to remove from the registry object from processing the uninstallation file.

30. The article of manufacture of claim 29, wherein the uninstallation file is created during installation of the computer program onto the computer system by a cross-platform installation package that is different from an operating system specific uninstallation file used during uninstall.

31. The article of manufacture of claim 30, wherein the operating system interface includes native operating system commands, and wherein removing information of installed components comprises making a call to the native operating system commands in the operating system interface program to edit the registry object to remove the information on the installed components.

32. The article of manufacture of claim 31, wherein the registry object is a product registry object including information on installed components.

33. The article of manufacture of claim 28, wherein the operating system includes an uninstallation program that removes installed components of an installed computer program from the computer system and updates the registry object during uninstallation, further comprising:

executing the operating system uninstallation program before calling the cross-platform uninstallation program;

executing a script program in response to executing the operating system uninstallation program to perform:

(i) determining whether the computer program to uninstall was installed using a cross-platform installation program instead of an operating system specific installation program;

(ii) making a call to the cross-platform uninstallation program to uninstall the computer program after determining that the computer program was installed using the cross-platform installation program; and (iii) uninstalling the computer program using the operating system uninstallation program after determining that the computer program was installed using the operating system specific installation program.

* * * * *

UNITED STATES PATENT AND TRADEMARK OFFICE
CERTIFICATE OF CORRECTION

PATENT NO.    : 6,374,401 B1
DATED         : April 16, 2002
INVENTOR(S)   : Bryce Allen Curtis It is certified that error appears in the above-identified patent and that said Letters Patent is hereby corrected as shown below:

<u>Column 15,</u>
Line 45, after ";" it should be a new paragraph.

Signed and Sealed this

Fourth Day of November, 2003

JAMES E. ROGAN
*Director of the United States Patent and Trademark Office*